United States Patent [19]

Sakai et al.

[11] Patent Number: 4,853,767
[45] Date of Patent: Aug. 1, 1989

[54] COLOR GRAPHIC IMAGE PROCESSING SYSTEM INVOLVING DATA COMPRESSION USING REFERENCE SAMPLES

[75] Inventors: Toshiyuki Sakai, Takatsuki; Yoshihiro Okada, Kyoto; Keiichiro Hyodo, Kobe, all of Japan

[73] Assignee: Mita Industrial Co., Ltd., Osaka, Japan

[21] Appl. No.: 16,918

[22] Filed: Feb. 20, 1987

[30] Foreign Application Priority Data

Feb. 20, 1986 [JP] Japan .................................. 61-36041

[51] Int. Cl.$^4$ ............................................. H04N 1/46
[52] U.S. Cl. ......................................... 358/78; 358/75
[58] Field of Search ..................... 358/75, 78, 80, 334, 358/261; 382/56

[56] References Cited

U.S. PATENT DOCUMENTS

| | | | |
|---|---|---|---|
| 4,301,469 | 11/1981 | Modeen et al. | 358/75 |
| 4,302,770 | 11/1981 | Hubbard, Jr. et al. | 358/75 |
| 4,307,415 | 12/1981 | Sundermeyer et al. | 358/80 |
| 4,342,047 | 7/1982 | Niemczyk et al. | 358/80 |
| 4,402,015 | 8/1983 | Yamada | 358/280 |
| 4,677,649 | 6/1987 | Kunishi et al. | 358/261 |
| 4,679,094 | 7/1987 | Rutherford et al. | 358/261 |
| 4,682,215 | 7/1987 | Adachi | 358/75 |
| 4,684,923 | 8/1987 | Koga | 358/261 |

FOREIGN PATENT DOCUMENTS 59-057573 of 1984 Japan .
59-161982 of 1984 Japan .

OTHER PUBLICATIONS

Digital Picture Processing by Azriel Rosenfeld and Avinash Kak (Copyr. 1976), pp. 98-107, 138-140, 150-152 and 275-296.

Primary Examiner—James J. Groody
Assistant Examiner—Robert M. Bauer
Attorney, Agent, or Firm—Beveridge, DeGrandi & Weilacher

[57] ABSTRACT

A color graphic image processing system which first reads the color graphic image to be processed by using a color image input device, and then encodes read-out signals into 4 through 6 units of encoded words per each color using a data input system. The color graphic image processing system then compresses the encoded data for storage in a storage data device and then the system transmits the stored data for conversion into specific data signals suited for an output device. The system then delivers complete picture signals to the output device.

6 Claims, 5 Drawing Sheets

COLOR GRAPHIC IMAGE PROCESSING SYSTEM INVOLVING DATA COMPRESSION USING REFERENCE SAMPLES

BACKGROUND OF THE INVENTION

The present invention relates to a color graphic image processing system, more particularly, to a novel image processing system for processing color graphic image.

Japanese Patent Laid-Open No. 161982/1984 represents a system for processing full-color image, i.e., normal color image.

Such a system first reads a full-color image to be processed as 8-bits input signals, then compensates for shading, i.e., compensating for unevenness of optical luminance, and then executes gamma compensation. Gamma compensation allows the output copy density corresponding to the input original density to be output as 6-bits signals by the degrading characteristic of the dither cumulative frequency in conjunction with the voltage output from charge-coupled device (CCD) in order that the relationship between these density values can remain.1:1 independent of uneven characteristics of input and output systems. The system presented by the above prior art then properly adjusts tonal characteristics of respective chrominance signals in accordance with masking compensation and UCR compensation processes. The system then converts half-tone image into binary codes using a dither processing circuit, and then it executes pulse width modulation using a multi-level conversion circuit to improve tonal characteristic of the half-tone image before eventually allowing a laser printer to reproduce a picture virtually identical to the image to be processed.

Japanese Patent Laid-Open No. 57573/1984 proposes a technique for sharpening a picture image by converting signals received from other than white level close to white area into signals indicating white color. This operation taking place before encoding of the signals into binary codes takes place and simultaneously with the conversion of signals other than black level close to black area into signals indicating black color.

The system in Japanese Patent Laid-Open No. 161982/1984 aims at processing a full-color image. The system applies 8-bits data to each of three primary colors comprised of red, green, and blue components, which allows each picture element to be represented by about 16 million colors. This system executes all the needed processing operations by reading image signals of full-color consisting of normal colors, thus obliging each picture element to represent color images by applying 24-bits (8-bits×3). Since many conventional personal computers and microprocessors available today process with 8-bits data width, the system proposed by the Japanese Patent Laid-Open No. 161982/1984 cannot easily be operated with many conventional personal computers and microprocessors presently available. Furthermore, the system of Japanese Patent Laid-Open No. 161982/1984 aims at precisely reproducing pictures by reading the original image signals. To achieve this aim, this system executes a variety of processes including shading compensation, gamma compensation, masking process, UCR process, dither process, and conversion of read image signals into binary codes, and as a result, this system unavoidably needs to execute complex data processing operations using a complicated system constitution.

The image processing device proposed by Japanese Patent Laid-Open No. 57573/1984 first detects edges of the original picture by applying an edge-detection operator such as Laplacean operator or a differential operator before eventually sharpening edges of images by modifying the density value of picture elements in the periphery of picture edges. As a result, if characters or lines having extremely thin configuration are present, the system related to the above art cannot easily detect the substance of fine characters or lines, and in addition, since it is difficult for this system to correctly determine the density value of fine characters or lines, it cannot easily determine the modified density value of picture elements in the periphery of picture edges, thus resulting in the difficulty for the system to securely reproduce edges having sharper contrast effect.

The inventors of the present invention expanded upon studies done on color graphs, which are substantially artificial images, and eventually discovered a variety of characteristics enumerated below. Noting that each full image is composed of a variety of colored images observing such a variety of images from a clearly visible distance, a color graph represents a specific colored area in which gradual color variation is not present.

(1) A picture generally contains ten or so colors in all.

(2) Colors appearing in respective areas which are uniform can represent certain values of information.

(3) A color graphic picture contains both colored characters and fine lines.

Accordingly, if a specific process identical to that which is applicable to a full-color picture is also applied to color graph, a variety of problems take place such as those described below.

(1) Any conventional color scanner made available for an input device provides 256 units of tone wedge per each component of three primary colors, while 24 bits (8-bits×3) of data are needed for each picture element. In addition, each color scanner must be provided with practically workable linearity throughout 256 tone wedges, thus an expensive system.

(2) Although the color scanner needs a complex constitution, optical characteristics of each color scanner like spectro-sensitivity distribution for example, and physical characteristics like aperture size such as that obtained in utilizing an iris diaphragm for example, are different from each other. Actually, image signals received from various input devices do not always match certain colors. Note that spectro-sensitivity distribution is the distribution of output signals against light having a specific frequency.

(3) When converting an image presented in a specific area where the image color is visually uniform into a signal using a color scanner, the image-converted signal doesn't show a constant value. In addition, even if there is such a specific area where color graph visually remains in uniform color effect, after delivering color via an output unit, it may eventually be determined that uneven color effect is still present in this area.

(4) Extraction of characters and fine lines from a specific area involves a certain difficulty. More particularly, since the dynamic range which is substantially the object of quantization is relatively wide, the image signal from any conventional color scanner doesn't show a constant value in a specific portion which is visually seen uniform by human eyes. Consequently, if the portion visually seen uniform by human eyes should be extracted, it is necessary for the operator to implement any processing operation such as smoothing process for converting fine structure into a widely visible range for example in order that the density value can be stabilized in the needed portion by means of compensation. However, if a smoothing process is applied, fine configuration of characters and fine lines cannot properly be held unaffected. To compensate for this, it is necessary for the color graphic processing system to preliminarily apply a masking process to finely composed characters and fine lines, which in turn results in a requirement for complicated processes to be carried out.

(5) A data input unit is generally provided with a capacity for producing 8-bits and 256 tone-wedge color data signals in conjunction with each component of three primary colors. On the other hand, a data output unit is generally provided with such a low capacity for delivering outputted data that a maximum of 4-bits color data signals per each component of three primary colors is realized. Normally, a data output unit is allowed to output about 1-bit color data signals. As a result, although the data input unit can produce 16 million colors expressed by 8-bits data per picture element, the data output unit can merely output 8 colors expressed by 1-bit data per picture element. This unavoidably generates a significantly large gap in the amount of information between the chromatic resolution of the data input and the chromatic expression capacity of the data output unit.

SUMMARY OF THE INVENTION

The primary object of the present invention is to provide a novel system which securely executes image processing operations including encoding and decoding of color graphic signals using a small amount of data.

To achieve this object, the preferred embodiment of the color graphic image processing system related to the present invention first reads a color graphic image to be processed using a color image input device and then encodes the read-out data into 4 through 6 units of encoded words per each color using a data input system. The color graphic image processing system then compresses the encoded data for storage in a data-storage device, and then the system transmits the stored data for conversion into specific data signals suited for an output device before eventually delivering complete picture signals to the output device.

The color graphic image processing system related to the present invention selects a novel signal-encoding system designed for correcting or compensating for the input characteristics such as the optical and physical characteristics of individual data input devices.

The color graphic image processing system selects a novel signal decoding system designed for correcting or compensating for output characteristics of individual output devices.

After encoding read-out signals into 4 through 6 units of encoded words per color, the color graphic image processing system related to the present invention may improve the data-compression efficiency by first encoding those encoded words into run-length codes, or the color graphic image processing system may detect edges at a specific portion where the encoded words vary so that sharper edges can be generated.

The color graphic image processing system related to the present invention first reads the color graphic image to be processed using a color graphic input device and then encodes the read-out image data into a relatively less number of encoded words, i.e., 4 through 6 encoded words per each color using a data input device in order that input signals having a relatively less bit number can be generated. The color graphic image processing system then compresses encoded data having a relatively less bit number for storage in a small-capacity storage device. After transmitting and decoding the data, the image processing system then converts the data into signals suitable for receipt by the output device. Thereafter the output device delivers completely processed image signals.

By selecting a specific encoding system designed for correcting or compensating for the input characteristics such as the optical and physical characteristics of individual input devices, independent of the difference of the input characteristics, the color graphic image processing system can correctly express a certain color by applying a specific encoded word.

Likewise, by selecting a specific decoding system designed for correcting or compensating for the output characteristics of individual output devices, independent of the difference of the output characteristics of individual output devices, the color graphic image processing system can correctly reproduce a certain color corresponding to a certain encoded word. In addition, by further converting the encoded data into run-length codes, the color graphic image processing system can more effectively compress data. Moreover, edges of color graphic image can be more effectively sharpened by detecting edge picture elements in which encoded words vary and having the color graphic image processing system refine the color graphic image to be processed by recognizing the edge as the border.

More particularly, as described earlier, color graph has three characteristics. Of these, a further explanation is given to the second characteristic below. The second characteristic is the one in which a certain amount of information is present when color in respective areas significantly differ from colors present in other areas. In other words, color graphic has an inherent characteristic in which color in a certain area do not contain a significant amount of information. This is very clear in the light of the following four factors.

(1) A color graph is provided with various colors for improving visual identification.

(2) Color tones of identical images differ from each other according to the kinds and characteristics of output devices.

(3) Image signals of identical images differ from each other according to the kinds and characteristics of input devices.

(4) Even if an image delivered from a certain output device is in a specific color equivalency relationship with the input images, if external factors, like an illumination effect for example, cause a variation in the images, then a color equivalency relationship cannot be established. Note that the color equivalency relationship indicates such a specific relationship in which two colors are visually identical to each other by human eyes' observation even though distribution of spectrum reflection rate physically differs from each other. A color rendering characteristic is indicative of a specific light source characteristic which affects the color visibility of an illuminated object.

Inventors of the present invention also confirmed the following: Physically, the number of colors of full-color images mainly reproducing natural conditions needed for human eyes to sufficiently appreciate natural views is considered to be $2^{14}$ (two-fourteenth power) per picture element. However, normally, a maximum of 20 colors per picture element are made available for generating colors of color graphic. This proves that redundancy is obviously too high when employing any conventional system which uses an enormous amount of data corresponding to $2^{14}$ bits for merely reproducing a maximum of 20 colors per picture element. It is clear that color graphic colors can be sufficed by merely stabilizing visibility of colors in other areas without significantly varying the colors themselves.

Based on the knowledge mentioned above, the color graphic image processing system embodied by the present invention reduces essential functions to be executed by input devices by providing each color with a maximum of 3-bits data by encoding read-out data into 4 through 6 units of binary words per color. In addition, in order to allow specific binary words encoded by the preceding operation to be applied constantly to a specific area of color graph, the color graphic image processing system reduces load from data processing devices which compress data and extract designated areas. Furthermore, the system related to the present invention effectively prevents the output image from incurring significant difference from each other, with such differences otherwise being an inherent characteristic of output devices.

BRIEF DESCRIPTION OF THE DRAWINGS

The present invention will be better understood from the detailed description given hereinbelow and the accompanying drawings which are given by way of illustration only, and thus are not limitative of the present invention in which.

DESCRIPTION OF THE PREFERRED EMBODIMENTS

Referring now more particularly to the accompanying drawings, one of the preferred embodiments of the present invention is described below.

Figure 1:
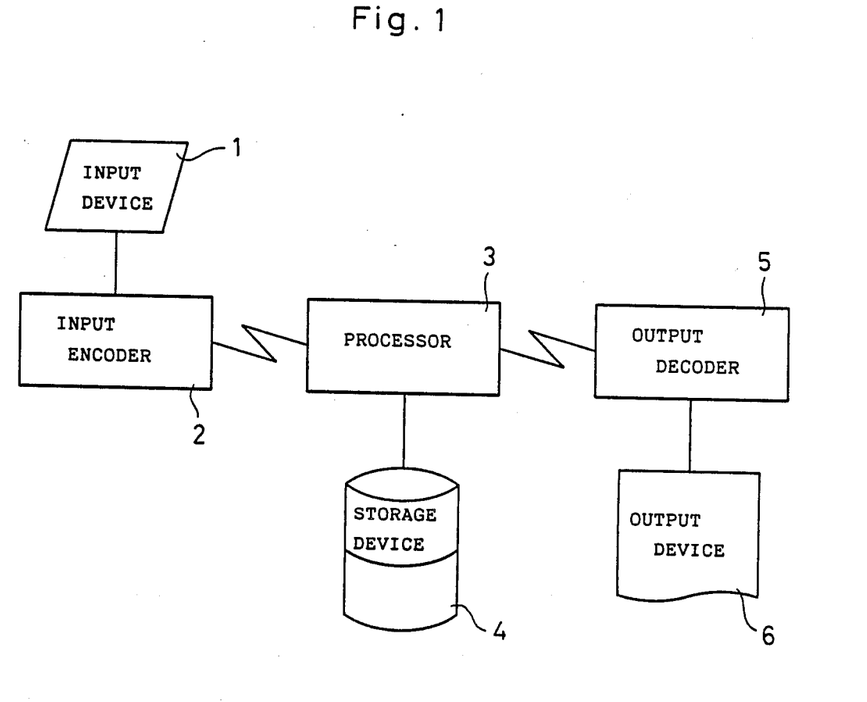
FIG. 1 is the simplified block diagram denoting the constitution of one of the preferred embodiments of the color graphic image processing system related to the invention.

FIG. 1 is the simplified block diagram denoting the constitution of the color graphic image processing system related to the present invention. Data of the color graphic image to be processed is first read by an input device 1 and then supplied to an encoder 2. Supplied data is then processed by the encoder 2 and further processed by a data-processing unit 3 for the processing and storage system before being stored in a data-storage device 4. All the data needed is transmitted to a decoder 5 of a data-output device so that the encoded data can be decoded by the decoder, and finally, image signals complete with conversion process suited for output operation are delivered to an image output device 6.

Figure 2:
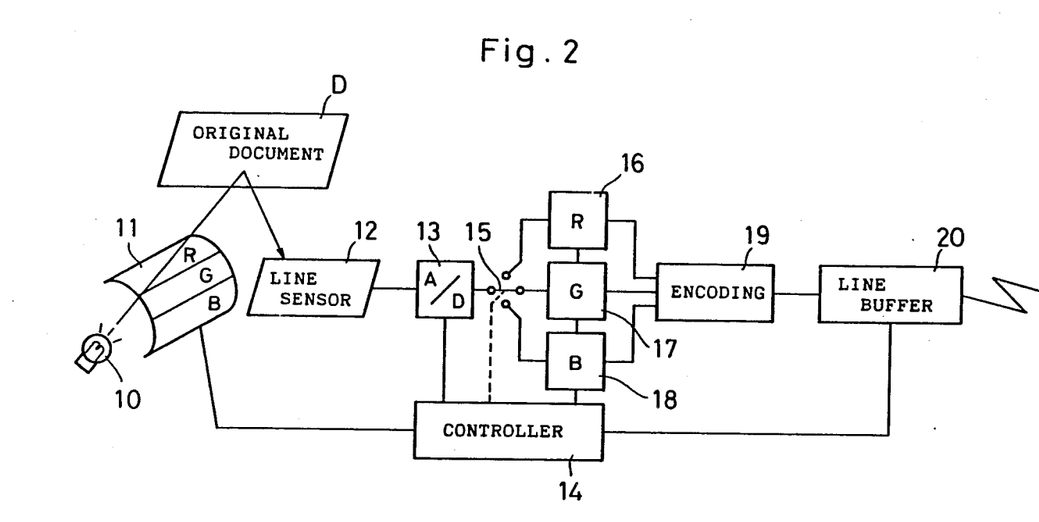
FIG. 2 is the simplified block diagram denoting the constitution of a scanner.

Note that any conventional color digital scanner such as a drum scanner or the simplified color scanner shown in FIG. 2 can be made available for the input device 1 mentioned above. When using a conventional color digital scanner like a drum scanner, read-out data signal should first be encoded by the encoder 2 before being transmitted to the data-processing unit 3. On the other hand, when using the other simplified color scanner shown in FIG. 2, the following system constitution is employed. First, an original document D is exposed by a light source 10 through a cylindrical three-primary-color filter 11. The line sensor 12 then receives reflected light from the light-exposed original document D. Image data of the light-exposed original document D is then converted into digital value signal by an A/D converter 13, which is then supplied to three-primary-color line buffers 16 through 18 via a switcher 15 which is controlled by a controller 14 together with the three-primary-color filter 11. Digitalized signal output from line buffers 16 through 18 is then applied to an encoder 19 so that the digitalized signal can be encoded before being applied to the data-processing unit 3 through a line buffer 20. The system constitution just mentioned above merely needs to add the three-primary-color filter 11 and line buffers 16 through 18 to apply three-primary-color to any conventional contact-type scanner for white and black color and to enable encoding of digitalized image data into 4 through 6 units of encoded words. This in turn allows the system to dispense with such materials featuring outstanding color balance for making up the light source 10, the three-primary-color filter 11, and the line scanner 12, thus eventually allowing the entire system to be completed inexpensively.

The encoder 2 encodes read-out color image data into 4 through 6 units of encoded words using any conventional color digital scanner like a drum scanner, whereas the system allows the A/D converter 13 to output encoded data when the simplified color scanner shown in FIG. 2 is made available.

Table 1 represents reference samples used for determining image-signal encoding method applicable to a certain scanner by applying values of three attributes of the Munsell color system.

As mentioned earlier, since colors made available for color graph are provided for improving visual identification, pure colors having higher coloration effect are mainly made available. Generally speaking, the higher the coloration effect and brilliancy, the better the visual identification. Accordingly, better visual effect can be achieved by effectively designing a system capable of correctly encoding reference samples composed of pure colors.

TABLE 1

| Tinctorial colors |
| --- |
| 4R4.5/14 5Y8/13.5 4G5.5/10.5 |
| 5B4/11 6P3.5/12.5 |
| 4YR6.5/14 4GY7/12 5BG4.5/10 |
| 6PB3.5/13 6RP4/13.5 |

| Non-tinctorial color |
| --- |
| N1 N9.5 |

Table 2 represents data of reference samples indicated by values of three attributes of the Munsell color system, in which colors were first measured by a color luminance meter and then denoted by CIE 1964 supplementary standard colorimetric system (hereinafter, referred to as XYZ color specification).

To set up a system for encoding color data capable of correcting or compensating for input characteristics of an input device, standardized XYZ color specification was used for representing reference samples without using color data directly fed from the input device. Compared to the conventional absorption curve of RGB components of three primary colors, absorption curves of X and Z respectively resemble that of R and B, whereas Y can be sought by linear approximation of RGB components.

(Reference:

Approximate expression of Y in conjunction with data of RGB components from a certain input device is shown below.

$Y = 0.0893\ R + 0.1690\ G - 0.1027\ B)$

TABLE 2

|  | X | Y | Z |
| --- | --- | --- | --- |
| N1 | 1.77 | 1.55 | 1.76 |
| N9.5 | 85.54 | 86.54 | 96.78 |
| 4R4.5/14 | 29.73 | 17.94 | 10.30 |
| 4YR6.5/14 | 47.32 | 36.46 | 8.91 |
| 5Y8/13.5 | 54.72 | 57.47 | 8.99 |
| 4GY7/12 | 31.28 | 42.61 | 7.90 |
| 4G5.5/10.5 | 13.62 | 22.36 | 14.35 |
| 5BG4.5/10 | 11.29 | 15.41 | 25.94 |
| 5B4/11 | 10.75 | 11.62 | 32.68 |
| 6PB3.5/13 | 16.51 | 12.34 | 49.29 |
| 6P3.5/13.5 | 22.16 | 14.92 | 31.75 |
| 6RP4/13.5 | 25.95 | 16.44 | 19.46 |

Using the above expression, it is possible for the system to convert data related to RGB components from an input device into codes of XYZ color specification by applying simple calculations.

Table 3 represents encoded words dealing with axes X, Y and Z when applying XYZ color specification in conjunction with reference samples denoted by values of three attributes of Munsell color system.

Using encoded words dealing with axes X, Y and Z the data processing device can effectively deal with encoded words combining X, Y and Z altogether by executing a simple calculation like $C = X + 5Y + 25Z$. In this case, C can represent a certain color on the XYZ color specification system.

TABLE 3

|  | X | Y | Z |
| --- | --- | --- | --- |
| N1 | 0 | 0 | 0 |
| N9.5 | 4 | 4 | 4 |
| 4R4.5/14 | 3 | 0 | 0 |

TABLE 3-continued

|  | X | Y | Z |
| --- | --- | --- | --- |
| 4YR6.5/14 | 4 | 2 | 0 |
| 5Y8/13.5 | 4 | 4 | 0 |
| 4GY7/12 | 3 | 3 | 0 |
| 4G5.5/10.5 | 1 | 1 | 1 |
| 5BG4.5/10 | 0 | 0 | 2 |
| 5B4/11 | 0 | 0 | 3 |
| 6PB3.5/13 | 1 | 0 | 4 |
| 6P3.5/13.5 | 2 | 0 | 3 |
| 6RP4/13.5 | 2 | 0 | 1 |

Figure 3:
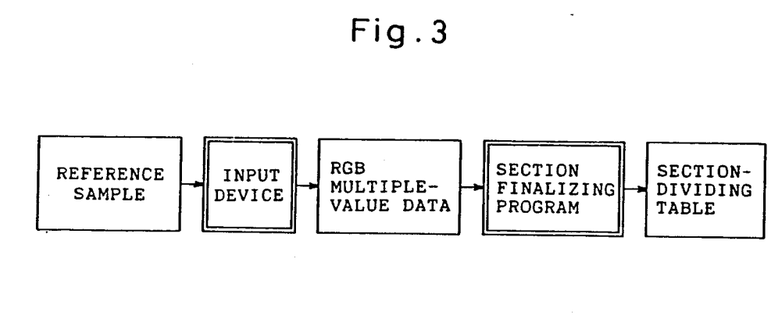
FIG. 3 is the operation flowchart denoting the steps involved in the preparation of the table needed for the encoding sectioning system and for the generation of correct encoded words corresponding to reference samples.

FIG. 3 denotes the steps involved in preparing a table related to the threshold value which splits the encoding divisions for generating encoded words correctly dealing with reference samples. The input device first reads data related to the reference sample to gain access to data containing multiple values of RGB components. Then, based on these multiple-value data, the controller prepares the table needed for splitting encoding divisions using a section-division finalized program.

Figure 4:
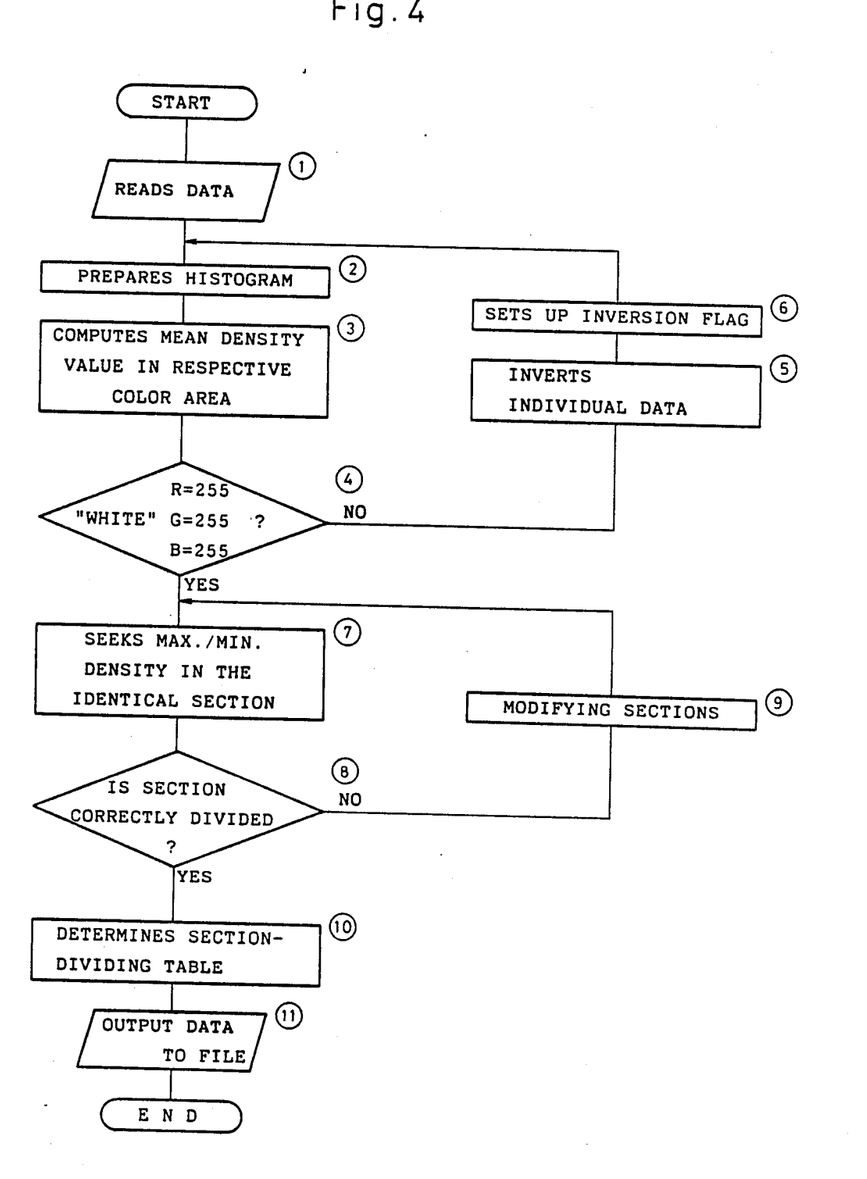
FIG. 4 is the operation flowchart denoting a detailed algorithm needed for establishing the encoding section division program shown in FIG. 3.

FIG. 4 denotes the detailed algorithm related to the section-division finalized program shown in FIG. 3. First, when step 1 is entered, the input device reads data related to the reference sample. When step 2 is entered, based on the read-out data, a histogram is prepared. When step 3 is entered, the controller computes mean value of density of respective color areas. Next, when step 4 is entered, the controller identifies whether a white area is present, or not, by checking to see if $R = 255$, $G = 255$ and $B = 255$, or not. If the absence of the white area is identified, in other words, if it is identified that no border is present, operation mode proceeds to step 5. When step 5 is entered, individual data are inverted. This activates step 6 in which inversion flags are set, and then the operation mode returns to step 2 for preparing histogram.

Conversely, if the controller identifies during step 4 that the white area is present, operation mode then proceeds to step 7 in which maximum and minimum densities in the identical area are sought until the white area is eventually detected. When step 8 is entered, the controller then identifies whether the section-division is done correctly, or not, by checking whether or not the difference between maximum and minimum densities is less than the predetermined threshold value. If it is identified that sectional division is not correctly done, step 9 is entered, in which section is modified in the manner of setting up new sections based on histogram prepared during step 2 for example, and then the operation mode returns to step 7.

Conversely if it is identified during step 8 that sectional division has been done correctly, operation mode proceeds to step 10, in which section dividing table specifying threshold values needed for splitting encoding section is determined. Next, when step 11 is entered, the section dividing table determined during step 10 is output to file.

In other words, the controller computes mean value of density based on the histogram prepared in accordance with read-out data and then executes division of sections using white areas for making up border areas. The controller then identifies whether the sectional division using the white-area border has been done correctly, or not. If it is incorrectly done, sectional modification is executed, and then, based on the eventual sectional division correctly done, the section dividing table is determined before eventually being output to file.

Figure 5:
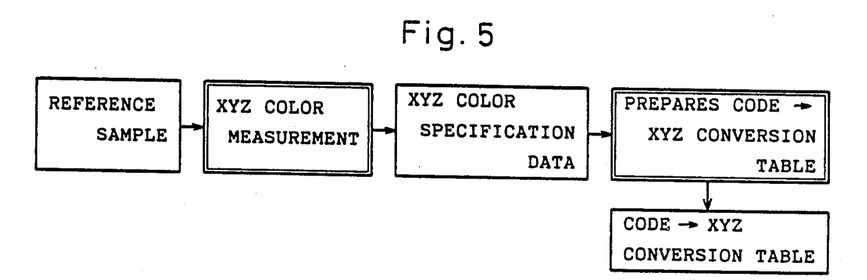
FIG. 5 is the operation flowchart denoting the steps involved in the preparation of the table needed for decoding the encoded words.

FIG. 5 is the flowchart denoting the steps needed for preparing a table for decoding encoded words. Colors of reference samples are measured by XYZ color-measuring device before generating data of XYZ color specification. The controller then prepares a codes→XYZ conversion table needed for converting coded data into XYZ color specification data.

Figure 6:
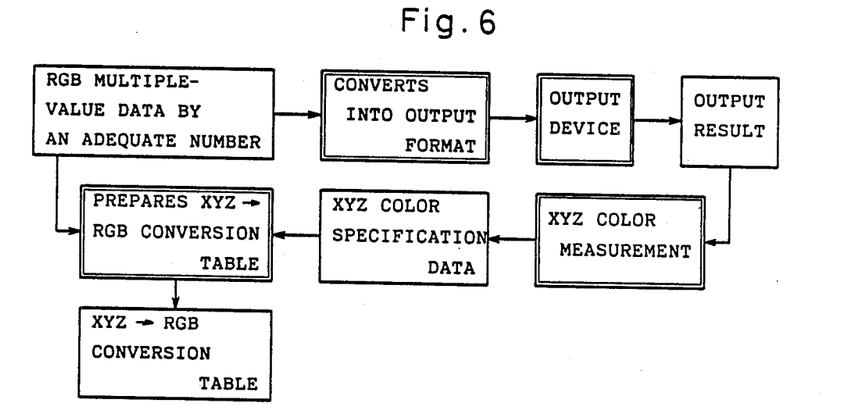
FIG. 6 is the operation flowchart denoting the steps involved in preparation of the table needed for supplying the appropriate image signals to the output devices.

FIG. 6 is the flowchart denoting the steps involved in the preparation of the table needed for providing an optional output device for image signals suited for the output device. An adequate number of multiple-value data related to RGB components is converted into signals suited for output format before being supplied to an optional output device. The system then generates data related to XYZ color specification after applying XYZ color measurement to the output color signals. The system then prepares a XYZ→RGB conversion table needed for converting data of XYZ color specification into multiple-value data related to RGB components in accordance with the adequate number of multiple-value related to RGB components and data related to XYZ color specification.

The system controller preliminarily measures colors to detect which colors can be output on receipt of data by an output device. By securely holding the relationship between data supplied to an output device and colors to be output from this output device, the system controller allows colors to be reproduced correctly.

Figure 7:
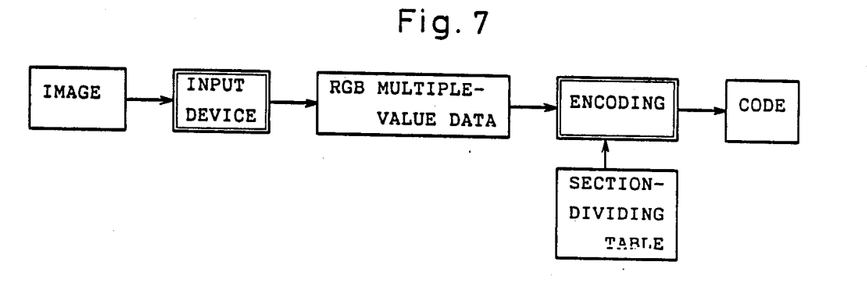
FIG. 7 is the operation flowchart denoting the steps involved in encoding an input image using the tables prepared by processes shown in FIGS. 3 and 4.

FIG. 7 is the flowchart denoting flow of processes needed for encoding input images using tables prepared by the processes shown in FIGS. 3 and 4. Input device reads the objective image for generating multiple-value data related to RGB components, and finally it encodes the multiple-value data related to RGB components in accordance with section-dividing table prepared by algorithm shown in FIG. 4.

Figure 8:
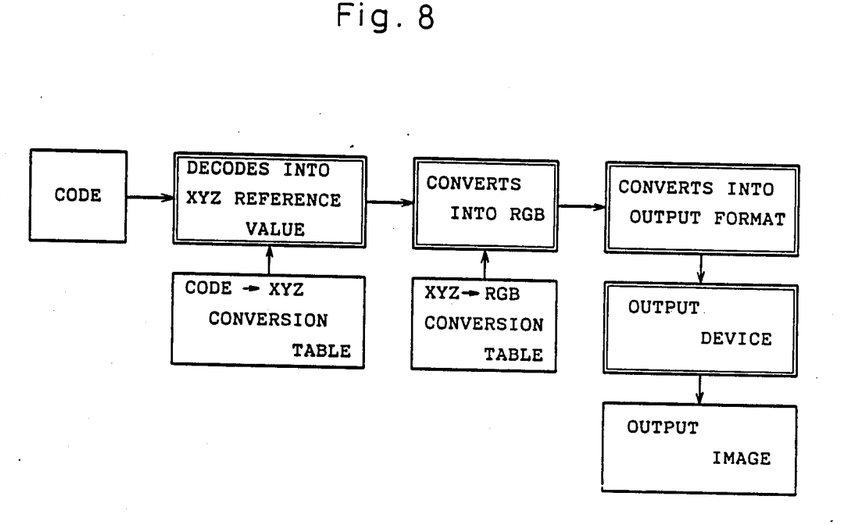
FIG. 8 is the operation flowchart denoting the steps involved in generating an output image from codes using tables prepared by processes shown in FIGS. 5 and 6.

FIG. 8 is the flowchart denoting flow of processes needed for generating output image from binary codes using the tables prepared by processes shown in FIGS. 5 and 6. The controller first decodes the code data into XYZ reference value in accordance with the code→XYZ conversion table prepared by processes shown in FIG. 5 for converting codes into XYZ reference value. The controller then converts the XYZ reference value into multiple-value data related to RGB components in accordance with the XYZ→RGB conversion table prepared by processes shown in FIG. 6. Then, the controller processes the converted RGB multiple-value data so that it can be suited for application to the output device before eventually generating output image.

The output images which were eventually generated by sequential processes executed by the color graphic image processing system related to the invention including reading, encoding, and decoding of the color graphic image to be processed proved to have been generated accurately in the perfectly identical colors without causing unevenness to occur in all areas denoting identical information.

Generally, density values of fine characters and lines having extremely fine width are not easily stabilized, thus resulting in the presence of uneven colors and difficulty in uniformly determining colors within designated areas.

According to the performance test result, since the a lesser number of encoded words was generated, the color graphic image processing system related to the invention easily provided specific encoded words and uniformly determined colors in the designated areas.

In addition, the performance test result proved that the image processing system provided a specific encoded word related to a certain color independent of the differences in the input characteristics of input devices. This was achieved, in part, by converting image signals from input devices into encoded words corresponding to XYZ color specification.

Likewise, the image processing system related to the invention satisfactorily produced specific colors which were related to a certain encoded word. This was achieved independently of the differences in the output characteristics of output devices by means of converting data to be supplied to the output device into the one best suited for delivery to the output device.

Furthermore, the image processing system related to the invention generated perfectly-shaped output image without even the slightest dullness along border areas as a result of implementing processes needed for sharpening image edges.

Figure 9:
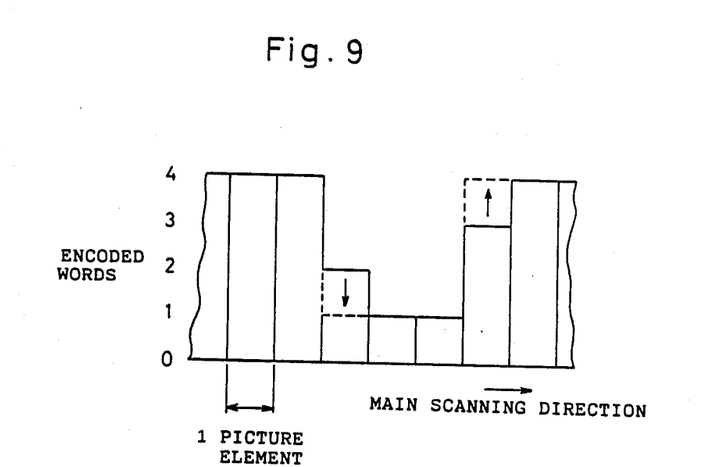
FIG. 9 is the chart illustrating the process for sharpening the edges of a color graphic image.

Now, a further explanation is given in conjunction with the image-edge sharpening process below. A certain image has specific numerical values related to XYZ color specification of a certain image, in which the density value of this image is encoded by applying the encoding-section dividing table. As shown in FIG. 9, if the encoded words vary from an area containing a large-grade encoded word to an area containing a small-grade encoded word in the direction of the main scanning line, then the image processing system executes a compensatory operation in order that the encoded word corresponding to the middle-grade can be made available for the encoded word of the small-grade area. Conversely, if the encoded words vary themselves from the area containing a small-grade encoded word to the area containing a large-grade encoded word, then the image processing system executes a compensatory operation in order that the encoded word corresponding to the middle-grade can be made available for the encoded word of the large-grade area, thus effectively sharpening image edges is achieved. In addition, since the data is encoded by utilizing a relatively small number of encoded words, image edges can easily be sharpened.

(1) Since the portion of the image represented by the varying encoded words is taken as the edge, the image processing system can easily detect the presence of the image edge without applying a conventional edge-detection operator.

(2) Since the encoded words of a certain picture element are present in narrow-width areas of fine characters and lines can be determined as a single encoded word without executing smoothing of areas, the image processing system can easily determine the compensated encoded words of the picture element near the image edges.

When extracting an optional area, since the data is encoded by applying a small number of encoded words, it is possible for the system to apply specific encoded words to any portion where the image color visually appears to be uniform. Note that, even by means of applying the encoding operation mentioned above, the system cannot apply specific encoded words to an area containing a specific density value very close to the encoding-section threshold value relative to a certain encoded word when it is encoded. As a result, basically, a specific process should be applied to this difficult area for applying specific encoded words by using a processor. However, in actuality, after applying the above processes to a number of images, the inventors have confirmed that there is no substantial need for implementing the further processing mentioned above and thus no substantial disadvantage is incurred. As a result, the image processing system can correctly extract an optional area from the image which is encoded by processes mentioned above by providing the data-processor 3 with a specific encoded word like the above cited "C" as parameter for example made from the combination of encoded words in areas X, Y and Z to be extracted. The system mentioned above correctly extracts an optional area by applying 0 through 124 of integer values per each color in case using the parameter "C" mentioned above. For example, the system can extract only "red" area by applying parameter "100" corresponding to the "red" area to the data-processor 3.

Table 4 represents the results of the comparison of compression rates between four objects including the original image, run-length encoding process, encoding process using 5 encoded data per color, and the combination of encoding process using 5 encoded data per color and run-length encoding process, respectively. Thus, Table 4 indicates that the compression rates of color graphic image can significantly be improved by applying the color graphic image processing system related to the present invention.

TABLE 4

| Images | Amount of data (bytes) | Compression rate |
|---|---|---|
| Original image | (1,000 × 875) × 3 = 2,625,000 | 1 |
| Run-length encoding process | 2,718,912 | 0.97 |
| Encoding process using 5 encoded data per color | 437,500 | 6 |
| Combination of encoding process using 5 encoded data per color and run-length encoding process | 72,663 | 36.1 |

As is clear from the foregoing description, the color graphic image processing system related to the present invention easily determines single applicable encoded word suited for a certain area. The system also easily determines differences of characteristics between both the input and output devices.

The system easily provides specific encoded words without splitting fine characters and lines. In addition, the system effectively constrains the adverse effect caused by background soiling, and yet, it easily extracts the desired area and sharpens image edges, thus easily and thoroughly eliminating dullness from borders of the processed image.

Furthermore, the system significantly improves the data-compression rate by combining a conventional encoding art such as run-length encoding system.

The above description merely refers to one of the preferred embodiments in which encoding operation is executed by applying five encoded words per each color. However, another preferred embodiment allows use of 4 or 6 encoded words per each color. More particularly, when applying 5 encoded words to respective RGB components of three primary colors, $5^3$ (five-third power)=125 colors can be represented. These 125 colors covering three primary colors can fully be produced by applying 7-bits data per picture element. Thus, when using any conventional 8-bits computer, the remaining 1-bit data capacity can be used for parity bit. If 4 units of encoded words per color were applied, needed colors can be represented by applying 6-bits data per picture element. Likewise, if 6 units of encoded words per color were applied, needed colors can be represented by applying 8-bits data per picture element. Although provision of 5 units of encoded words is most desirable, if it is allowable to introduce such a particular waste as mentioned above, it is also possible for the system to set 4 or 6 units of encoded words. Furthermore, it is also possible for the system to modify the constitution in various ways without departing from the essential spirit and scope of the present invention defined in the following claims.

What is claimed is:

1. A color graphic image processing method comprising the steps of:

reading a color graphic image by utilization of a color image input device with the color image input device transforming that which is read into image data, coding the image data in accordance with section dividing means which acts to compress the image data by dividing a density region of each color in the color graphic image into sections represented by 4 through 6 codes with the codes being based upon data obtained by measuring a plurality of reference color samples with said color image input device, converting the coded data to a color image output signal in accordance with conversion means in which a code corresponding to a reference color sample is related to a color image output signal which is determined so as to cause a color image output device to output a color substantially the same as said reference color sample, providing the color image output signal to the color image output device to reproduce a color graphic image.

2. A color graphic image processing method according to claim 1, wherein said section dividing means includes stored information which is prepared by making available a plurality of reference color samples, assigning 4 to 6 codes with respect to the color densities of each reference color sample, measuring the color densities of the reference color samples with the color image input device, and dividing a density region of each color into sections corresponding with said codes by relating measured densities of reference color samples to said codes.

3. A color graphic image processing method according to claim 2, wherein a total of 5 codes are assigned with respect to the color densities.

4. A color graphic image processing method according to claim 1, wherein said conversion means includes stored information which is prepared by making available the plurality of reference samples, coding every reference color sample, inputting a number of color image output signals to the color image output device, deciding a color among the outputted colors which is substantially the same as the reference color sample, and relating the code of the reference color sample to the color image output signal of the decided color.

5. A color graphic image processing method according to claim 4, wherein a total of 5 codes are assigned with respect to the color densities.

6. A color graphic image processing method according to claim 1, wherein the coded data obtained in accordance with the section dividing means is further compressed by subjecting the coded data to a run-length encoding process.

* * * * *

UNITED STATES PATENT AND TRADEMARK OFFICE
CERTIFICATE OF CORRECTION

PATENT NO.   : 4,853,767

DATED        : August 1, 1989

INVENTOR(S)  : Sakai, et al.,

It is certified that error appears in the above-identified patent and that said Letters Patent is hereby corrected as shown below:

On the cover page after "Assignee: --Mita Industrial Co., Ltd.,

Osaka, Japan, part interest.--

Signed and Sealed this

Twelfth Day of February, 1991

Attest:

HARRY F. MANBECK, JR.

*Attesting Officer*   *Commissioner of Patents and Trademarks*